May 4, 1937.  R. C. BENNER ET AL  2,079,101
CAST REFRACTORY AND METHOD OF MAKING IT
Filed Nov. 22, 1935
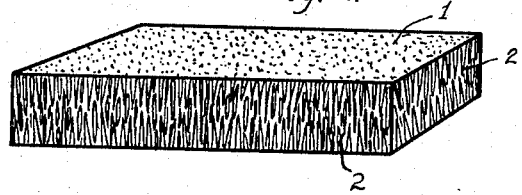
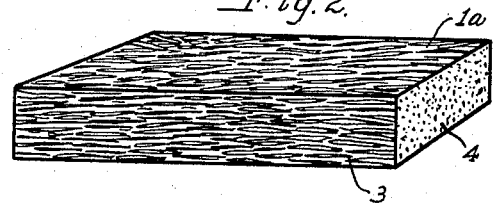
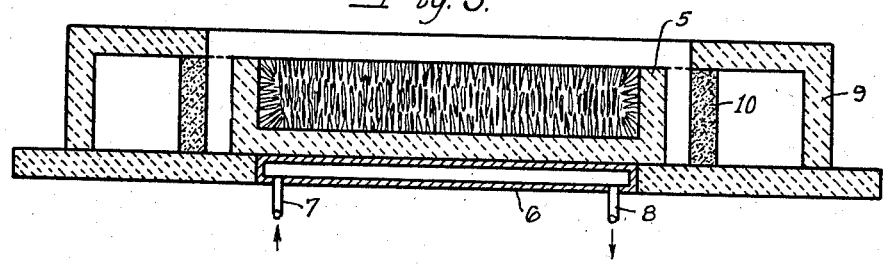
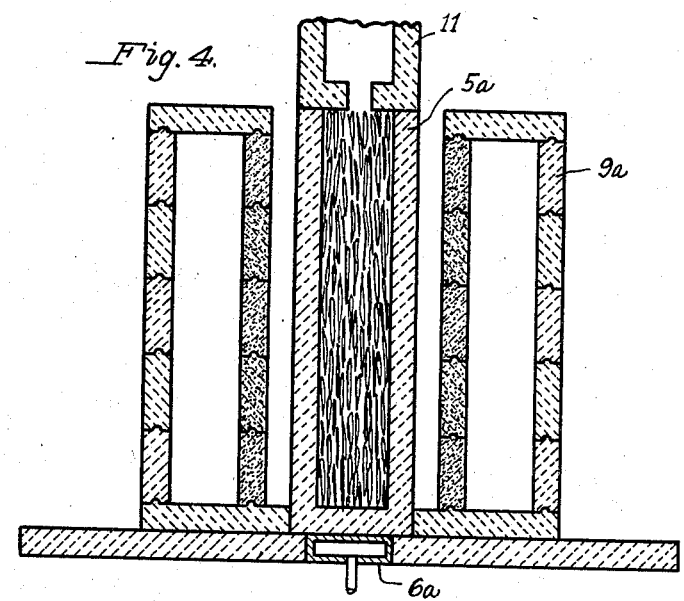
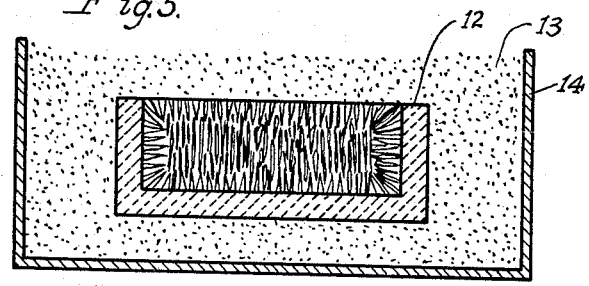
INVENTOR.
RAYMOND C. BENNER
GEORGE J. EASTER
BY
ATTORNEY.

Patented May 4, 1937

2,079,101

UNITED STATES PATENT OFFICE 2,079,101

CAST REFRACTORY AND METHOD OF MAKING IT

Raymond C. Benner and George J. Easter, Niagara Falls, N. Y., assignors, by mesne assignments, to The Carborundum Company, Niagara Falls, N. Y., a corporation of Delaware Application November 22, 1935, Serial No. 51,113

14 Claims. (Cl. 49—79)

This invention relates to refractories, especially refractory shapes and apparatus.

In the refractory shapes made heretofore the refractory particles, whether grains or crystals, have been heterogeneously oriented throughout the shape, and particularly has this been true of cast refractories. Such random orientation of the particles of refractory material has been the cause of certain disadvantages which characterized refractory articles made by the practice prevailing heretofore in the production of refractory shapes.

This invention, while applicable generally to refractory articles, is especially adapted to cast articles, and apparatus made therefrom, for contact with materials at high temperatures, such as slag and the like, and particularly glass melting apparatus, to which this invention is especially adapted, for which reason it may be described with particular reference thereto by way of illustration.

The random orientation which characterizes prior cast refractory shapes has been disadvantageous because, owing to the nature of random aggregated solids, it has been necessary to have in the refractory body a sufficient amount of intercrystalline glass to materially decrease the resistance of the block to fluxes, or when this glass has been omitted it has entailed a certain degree of porosity whereby molten glass or slag has been capable of penetrating rather readily into the shape. In consequence, mechanical disruption of the shape at the working surface has resulted, and the tendency has been for the refractory to break away in relatively large pieces. Such an action is especially undesirable in glass manufacture because the pieces of refractory material may cause imperfections in the resultant glass article, such as striae and stones. Likewise, with some types of glass it is an important desideratum that as little extraneous matter as possible enter into the glass composition, but this has not been wholly avoidable because of the relatively rapid corrosion of the refractory by the molten glass, and such contamination of the glass has been increased through partial or complete dissolution of the material disrupted from the surface of the refractory shape.

It is among the objects of this invention to provide cast refractory shapes and articles, and refractory apparatus, of improved character, in which the orientation of the refractory crystals is controlled at or adjacent the exposed, or working, faces to adapt them to the particular conditions encountered in use, in which, singly or in combination, resistance to mechanical disruption, corrosion, or penetration by molten glass, slag, and other agents, can be provided and controlled according to need, thereby minimizing the effect of such factors, in which porosity is minimized, and which are characterized by other advantageous features.

A special object of the invention is to provide glass melting apparatus comprising cast refractory embodying the foregoing desirable improved characteristics and whereby penetration by the molten glass may be minimized and disruption confined chiefly to the production of small and rapidly soluble particles, thereby avoiding disadvantageous consequences heretofore met with in glass melting apparatus as previously manufactured.

Still another object is to provide a cast refractory article composed of refractory in the form of crystals having crystal axes of different lengths, the crystals being preponderantly oriented in a preferred direction.

The invention may be described in connection with the accompanying drawing in which Figs. 1 and 2 are perspective views of one form of cast refractory shape schematically illustrating two embodiments of the invention; and Figs. 3 to 5 vertical sectional views through apparatus adapted for use in the practice of the invention.

The invention is predicated upon our discovery that disadvantages heretofore encountered in the use of refractory shapes, particularly those for use in contact with molten glass, slag, and other similar materials, may be repressed or avoided entirely, and substantial advantages gained, by providing a cast refractory article, or shape, comprising for a substantial distance inwardly from at least one face, refractory material in the form of crystals having major and minor axes and with the crystals preponderantly oriented with one of the crystal axes parallel, that is to say, with the majority of the crystals disposed with the same axis in a single direction.

In other words, our invention provides a cast refractory shape the working face, at least, of which consists of refractory material which for a material distance inwardly from the face is in the form of crystals having major and minor axes and so disposed that the preponderance of the crystals lie with a given axis perpendicular to the face, or parallel to the face, as the case may be. Both types of crystal disposition are contemplated by our invention, the essence of which resides in parallel disposition of the majority of the crystals. Whether the major axis of the crystals will be parallel or normal to the working face will, in general, depend upon the particular conditions which will be encountered in use.

That is, by having the crystals oriented preponderantly in a given direction it is possible to control the characteristics of the resultant refractory article. For instance, if all or most of the crystals are oriented with their major axis parallel to the working face the tendency will be for the shape to afford maximum resistance to penetration by material which is in contact with the refractory. Consequently, penetration will occur to a minimum depth, especially where the refractory crystals are embedded in an interstitial glass matrix. In further consequence of such a crystal arrangement, the tendency for the refractory material to break away in relatively large pieces is repressed, as compared with heterogeneous crystal orientation, and the tendency is, if any disruption occurs, for the refractory material to slough off in the form of very small crystals. These, because of their small size, are capable of dissolving completely, thus avoiding seed formation and other defects in glass caused by foreign matter.

If, on the other hand, the crystals are disposed with their major axis perpendicular to the working face it will be seen that an unusually strong structure is provided because the crystals are, so-to-speak, anchored at some distance interiorly of the shape. Not only is this disposition desirable for that reason, but also resistance to mechanical disruption should normally be at a maximum, being still greater than in a refractory having crystals oriented preponderantly parallel to the working face. Also, where the crystals are of elongate, e. g., acicular, form, the working face presents primarily only the ends of the crystals to the glass or slag, whereby corrosion of the refractory is repressed.

In both instances it will be seen that by having the crystals oriented preponderantly in a single direction the refractory possesses a denser structure than is attained, in refractory shapes in which the constituents are disposed with random orientation. It will be observed also that it is possible to provide properties optimum for particular conditions.

In the preferred embodiment of the invention the refractory shape consists substantially throughout of refractory crystals disposed in the manner just referred to. Hence as the working face becomes corroded or eroded away there is continuously presented a working face of the same character as possessed by the refractory in its initial condition.

As noted hereinabove, the invention involves the use of refractory material in the form of crystals having major and minor axes. By this we have reference to grains or crystals whose dimension in one direction, such, for example, as its length, is substantially greater than in another direction, for example, width or thickness. For many purposes we prefer that the crystals be acicular, or needle-like, in which case one axis is greater than the other two, but other types of crystals having major and minor axes are within the contemplation of the invention. For instance, refractory materials which crystallize in the form of platelets, or analogous forms, have two major and a minor axis, or may have three unequal axes. In refractory installations where the particular type of slag is best resisted by substances having these crystal forms such crystals may be advantageously oriented as here described. Where needles or other elongate crystals are present it will be seen that they are disposed preponderantly with the long axis either parallel or perpendicular to the working face. Similarly, with other types of crystal the major or the minor crystal axis will be presented to the working face of the refractory. Thus, referring to platelets it will be seen that they may be disposed either with the broad face parallel to the working face of the refractory, or with the edge of the plate facing the working face.

Various refractory materials may be used in the practice of the invention depending on the conditions of use. For glass melting apparatus we now prefer to form the refractories from materials containing alumina and silica, advantageously those with about 15 to 40 per cent of silica. Of the latter materials mullite ($3Al_2O_3.2SiO_2$) appears to be most suitable, as it is highly refractory and crystallizes in the form of elongate needles. Other materials of similar character may be utilized also, examples being titanium dioxide ($TiO_2$) crystals formed from a glassy matrix, and beta alumina ($\beta Al_2O_3$) platelets formed from a fused magma.

Cast refractory shapes may be made, in accordance with one aspect of our invention, by providing a mold with molten refractory material which can be solidified to form crystals having major and minor axes, as referred to hereinabove, and by so regulating the cooling of the material in the mold as to cause the crystals which form to lie, at least for a substantial distance inwardly from at least one face preponderantly with one of their axes parallel. This may be accomplished, for example, by causing heat to be abstracted more rapidly from one face of the mold than from other faces, as by chilling one face, or by retarding dissipation of heat from certain faces of the mold whereby at the faces from which heat transfer is not impeded the same result will follow.

Both such procedures entail differential cooling of faces of the mold, and the two procedures may be combined if desired. For example, if it is desired to form a shape having the refractory crystals disposed with their major axis perpendicular to a broad working face, the mold, containing molten refractory, may be cooled by application of cooling means to one of its broad faces, or by retarding the cooling from the side faces, or by effecting increased rate of heat transfer from the broad face while retarding cooling from the side faces of the mold. Where it is necessary to provide only a working face in accordance with the invention the cooling may be controlled in the manner described to cause oriented crystallization at and inwardly from the working face. By causing two opposed faces to be cooled more rapidly than the adjoining faces, the refractory may be caused to crystallize with the crystals throughout the shape disposed preponderantly in a single direction.

It will be understood that in producing these refractories by such procedures the directed orientation inwardly from a face will be obtained through control of solidification to produce the desired orientation. Thus, using a refractory productive of columnar or needle-like crystals, they may be oriented with the long, or major, axis perpendicular to a face by chilling at that face (or by retarding cooling from the adjacent faces), while they may be oriented to be parallel to a face by chilling the adjoining faces. Similar considerations apply to shapes having the crystals throughout oriented in a preferred direction. In this latter case it will be seen that for many types of shape it is necessary only to produce a shape in accordance with the invention, in which at certain faces the crystals will be oriented one way, and at the other faces in the opposite direction, and then lay up the shapes to present as a working face the one providing optimum properties for the conditions to be encountered.

Having reference now to the drawing in Fig. 1 and in Fig. 2 the drawing is made somewhat exaggerated to show the predominant character of the block clearly. As a matter of practice, the extreme outer face of the piece chills so fast against the mold wall that the outermost small fraction of an inch is a non-crystalline glass, and the predominant oriented crystal structure becomes apparent only after this surface skin has been removed. Also there is in general some crystal orientation of the same character adjacent each mold face (as indicated for example in Fig. 3) so that the purely oriented structure of Figs. 1 and 2 should be regarded as ideal and is so illustrated only in order to aid in understanding the invention. Fig. 1 represents a rectangular block adapted, for example, for use in constructing glass melting apparatus. This block comprises refractory material in the form of acicular crystals oriented preponderantly with their longer axis perpendicular to the broad face 1 of the block, and therefore with their long sides parallel to the narrow faces, or sides, 2 of the block. Such a shape may be used with the broad faces 1 presented to the glass or slag, in which case maximum mechanical locking of the crystals is obtained with minimized mechanical disruption and corrosion. Or, the narrow faces 2 may be presented as the working faces of the shape, with consequent improved resistance to fluid penetration and with improvement in disruption characteristics as compared with prior refractories. In both instances breaking away of the refractory in large pieces is substantially eliminated.

Where the sides 2 of the shape are presented to the slag, glass, or the like, it will be seen that the shapes may offer improved resistance to erosion of the block caused by circulation or currents of the molten material with which it comes in contact. Thus, the face 2 may be disposed in the structure with the elongate crystals normal to the direction of flow of the material, which should tend to reduce mechanical erosion as compared with present random oriented shapes. Or, if it is desirable for any particular reason, a face 2 may be presented with the long sides of the crystals disposed parallel to the direction of flow of molten material along its surface.

Fig. 2 is a similar perspective view of a shape made in accordance with the invention in which the crystals are preponderantly disposed with their longer axis parallel to the major faces 1a, and consequently also to the long sides 3 of the shape. In this instance the crystals are disposed with their ends perpendicular to the narrow ends 4 of the shape. Here again the shape may be used with any one of its faces presented to the glass or the like, according to the particular combination of properties desired.

Fig. 3 shows an apparatus that may be used in making a shape such as is shown in Fig. 1. It comprises a refractory mold 5 supported on a base which includes a chilling plate 6 through which a cooling fluid, such as water, may be circulated by means of inlet and outlet pipes 7 and 8. Around the sides of the refractory mold 5 there is disposed a ring-shaped fire-box comprising, in the embodiment shown, top, bottom and outer walls 9 of insulating refractory, and an inner wall 10 of refractory material of relatively high heat conductivity.

In the use of this apparatus the mold is provided with molten refractory material, as by pouring premelted refractory therein, the mold being preheated, or by melting it in the mold. Chilling member 6, through which cooling fluid may be circulated, causes heat to be withdrawn more rapidly from the bottom of the mold than from the sides, and the crystals which grow from the nuclei which form orient themselves unidirectionally substantially completely over practically the entire area of the face. In the case of mullite this orientation is such that the major axis of the crystals is perpendicular to the bottom of the mold, as indicated schematically in Fig. 3. This action may be enhanced by preventing dissipation of heat from the narrow sides of the mold by regulating the heat flow through the conductive refractory 10, whereby the heat transfer through the sides of mold 5 is regulable. In such case the upper broad surface of the refractory is free to radiate heat to the surrounding atmosphere, wherefore the refractory is cooled rapidly at both of its broad surfaces and consists preponderantly of crystals oriented in a single direction.

Although the invention contemplates a cast refractory having the crystals adjacent at least its working face, and preferably throughout, disposed in a single direction, as schematically shown in Figs. 1 and 2, we have found that there is generally a tendency for the crystals to orient themselves similarly at adjoining faces although only to a slight distance inwardly. Thus, as indicated in Fig. 3, where the chilling member 6 does not extend throughout the full width of the mold bottom, the crystals at the surface of the narrow sides of the shape will be oriented perpendicular thereto like the crystals at the broad faces. It will be observed, however, that such crystals extend inwardly to only a slight distance, most of the shape being composed of crystals parallel to the narrow sides. Therefore it may be considered that in the shape the crystals are preponderantly disposed in a single direction.

Fig. 4 shows an apparatus adapted to form a cast shape such as shown in Fig. 2 and in which the crystals are in general parallel to the broad faces of the casting and to one another. The refractory mold 5a rests with a narrow edge on a cooling plate 6a, and the broad faces of the mold are presented to a fire-box ring 9a similar to that described in connection with Fig. 3. Such a mold is preferably used with a refractory header 11. A similar header is desirable in the set-up of Fig. 3 provided care is taken that it does not unduly prevent the escape of heat from the upper face of the casting. The mold is provided with molten refractory, and upon causing regulated solidification as described hereinabove the crystals grow with their long axes preponderantly parallel to the broad faces and the sides, and perpendicular to the ends, of the shape, as shown in Fig. 2.

Still another means of achieving the same result is shown in Fig. 5. This apparatus comprises a refractory mold 12 the sides and bottom of which are enclosed within an insulating material 13, such as sand or finely divided "Sil-O-Cel", or the like held in place by a metallic shell 14. After the mold has been filled with molten refractory its upper surface is covered with a layer of insulating material. The depth of insulating material over and under the top and bottom usually will be less than the thickness of the insulation at the sides of the mold, to cause more rapid cooling from the top and bottom than from the sides. In the embodiment shown the solidified shape will then have its crystals preponderantly oriented to be perpendicular to the broad faces of the mold, being similar to the shape shown in Fig. 1.

Although in the cast shapes provided by the invention the directional orientation ideally will extend to the surface of the face, it has been found in the practice of the methods just elucidated that the cooling of the molten refractory by the chilling plate or mold is so rapid that the contacting layer, which becomes the outer surface of the solidified article, may solidify in the form of a glass. Such a glassy layer will ordinarily be quite thin, however, of the order, for instance, of one-thirty-second to one-sixteenth inch, and the crystals will be directionally oriented for a substantial distance inwardly therefrom, or throughout the shape therebelow, in the manner characteristic of the invention. Since the glassy layer is thin and the crystals below it are oriented in accordance with the invention it does not detract from the advantages which accrue from the invention, and for all practical purposes it may be considered that the directionally oriented crystals are presented to, or exposed at, the face.

If desired or necessary, strains set up in the shapes due to solidification may be relieved by heat treating the solidified shape. This may be accomplished by annealing the shape, either in the mold or after removal therefrom, or the solidified shape may be packed in an insulating powder to cause it to cool at a sufficiently slow rate and thereby to heat treat it for relieving strains. The latter procedure will follow, for example, in the use of an apparatus such as shown in Fig. 5.

The shapes thus produced are then used in the customary manner in constructing furnace walls requiring slag or flux resistant refractory faces. For example, glass tanks, open hearth furnace walls, enamel smelters and the walls of powdered coal fired boiler furnaces may be constructed with particular advantage from such cast shapes. As indicated hereinabove, the shapes are set to present a working face having the crystals preponderantly with their major axis or with their minor axis presented thereto, as the case may be. A glass melting apparatus for example, thus constructed in accordance with the invention, provides a substantial advance in the art through reduction in corrosion and breaking away of refractory material, especially because in connection with the latter factor the disadvantages of stone formation and other allied faults are avoided, with consequent improvement in quality of product, manufacturing economies and other advantages.

According to the provisions of the patent statutes, we have explained the principle and mode of practicing our invention, and have illustrated and described what we now consider to represent its best embodiments. However, we desire to have it understood that, within the scope of the appended claims, the invention may be practiced otherwise than as specifically illustrated and described.

We claim:

1. That method of making refractory shapes which comprises providing a mold with molten non-metallic refractory material which crystallizes in crystals having major and minor axes, and cooling faces of the mold at differential rates and thereby causing solidification with the crystals preponderantly oriented with the same crystal axis in a single direction inwardly of the casting from the most rapidly cooled face.

2. That method of making refractory shapes which comprises providing a mold with molten non-metallic refractory material which crystallizes in crystals having major and minor axes, cooling faces of the mold at differential rates and thereby causing solidification with the crystals preponderantly oriented with the same crystal axis in a single direction inwardly of the casting from the most rapidly cooled face, and heat treating the solidified shape to relieve strains therein.

3. That method of making refractory shapes which comprises providing a mold with molten refractory containing alumina and about 15 to 40 per cent of silica and which crystallizes in elongate crystals, and cooling faces of the mold at differential rates and thereby causing solidification with the crystals preponderantly oriented with the same crystal axis in a single direction inwardly of the casting from the most rapidly cooled face.

4. A cast refractory article comprising non-metallic refractory material in the form of crystals having major and minor axes preponderantly oriented with one of said axes parallel for a substantial distance inwardly from at least one face of the article.

5. A cast refractory article comprising non-metallic refractory material in the form of crystals having major and minor axes preponderantly oriented with the major axis perpendicular to one face of the article for a substantial distance inwardly from said face.

6. A cast refractory article comprising non-metallic refractory material in the form of crystals having major and minor axes preponderantly oriented with the major axis parallel to one face of the article for a substantial distance inwardly from said face.

7. A cast refractory article comprising elongate crystals of refractory material and composed of alumina and about 15 to 40 per cent of silica, said crystals being preponderantly oriented with one crystals axis parallel for a substantial distance inwardly from at least one face of the article.

8. A cast refractory article consisting principally of elongate crystals of mullite preponderantly oriented with one axis parallel for a substantial distance inwardly from at least one face of the article.

9. A cast and annealed refractory shape comprising elongate crystals of non-metallic refractory material disposed preponderantly with one axis parallel throughout the shape.

10. A cast refractory shape of substantially rectangular section having major and minor axes and comprising elongate crystals of non-metallic refractory material oriented preponderantly with the major crystal axis prependicular to the major axis of the shape and thereby lying substantially completely perpendicular to the broad faces of the shape.

11. A furnace wall having a face exposed to molten fluxes, said wall comprising cast non-metallic refractory blocks composed principally of crystals having unequal axes, in which blocks the crystal axes are preponderantly uniformly oriented with respect to the exposed face of the wall.

12. In the face of a wall exposed to molten fluxes, a cast non-metallic refractory block composed principally of crystals having unequal axes, in which blocks the crystals are preponderantly so oriented that a major axis of each crystal is roughly perpendicular to the exposed face of the block.

13. A furnace wall having a face exposed to molten fluxes, said wall comprising blocks of cast aluminum silicate in which mullite crystals are preponderantly oriented roughly perpendicular to the exposed face of the wall.

14. A glass melting container formed of cast refractory shapes which for a substantial distance inwardly from the glass-contacting face comprise elongate crystals of mullite, preponderantly oriented with the major axis of the crystals rughly perpendicular to the glass-contacting face.

RAYMOND C. BENNER.
GEORGE J. EASTER.